US008108074B2

(12) United States Patent
Boder

(10) Patent No.: US 8,108,074 B2
(45) Date of Patent: Jan. 31, 2012

(54) APPARATUS AND METHOD FOR OPTIMIZING OPERATION OF SUGAR DRYERS

(75) Inventor: Howard M. Boder, Guildford (GB)

(73) Assignee: Honeywell International Inc., Morristown, NJ (US)

( * ) Notice: Subject to any disclaimer, the term of this patent is extended or adjusted under 35 U.S.C. 154(b) by 548 days.

(21) Appl. No.: 12/029,587

(22) Filed: Feb. 12, 2008

(65) Prior Publication Data
US 2009/0204246 A1 Aug. 13, 2009

(51) Int. Cl.
G05B 13/02 (2006.01)

(52) U.S. Cl. ............ 700/274; 700/31; 700/103; 700/29; 700/275; 700/53; 34/411; 34/445; 34/446; 34/447; 34/483; 34/499; 34/68; 34/511

(58) Field of Classification Search ............ 700/36, 700/208, 275, 103, 31, 29, 53; 34/445–447, 34/483, 411, 68
See application file for complete search history.

(56) References Cited

U.S. PATENT DOCUMENTS

| 3,496,550 | A | * | 2/1970 | Schachner | 712/210 |
| 4,135,309 | A | * | 1/1979 | Bosnjak | 34/397 |
| 4,599,809 | A | | 7/1986 | Parkes | |
| 4,704,805 | A | | 11/1987 | Kaya et al. | |
| 4,969,408 | A | * | 11/1990 | Archer et al. | 110/347 |
| 5,079,852 | A | * | 1/1992 | Nakayama et al. | 34/526 |
| 5,805,452 | A | | 9/1998 | Anthony et al. | |
| 6,158,220 | A | * | 12/2000 | Hansen et al. | 60/649 |
| 6,199,294 | B1 | | 3/2001 | Becker | |
| 6,792,331 | B1 | * | 9/2004 | Hamstrom et al. | 700/208 |
| 2003/0120361 | A1 | * | 6/2003 | Anderson et al. | 700/31 |
| 2004/0059441 | A1 | * | 3/2004 | Martin et al. | 700/29 |
| 2006/0053791 | A1 | * | 3/2006 | Prentice, III | 60/645 |
| 2008/0202159 | A1 | * | 8/2008 | Fountain | 62/612 |
| 2009/0056162 | A1 | * | 3/2009 | McMahon et al. | 34/511 |
| 2009/0125825 | A1 | * | 5/2009 | Rye et al. | 715/764 |
| 2009/0210094 | A1 | * | 8/2009 | Boder et al. | 700/276 |
| 2009/0254198 | A1 | * | 10/2009 | Lu et al. | 700/7 |
| 2009/0319070 | A1 | * | 12/2009 | Morningred et al. | 700/103 |

OTHER PUBLICATIONS

Merino Gomez, Alejandro. "Modelling and Simulation of a Pulp Dryer". 2 Reunion de Usuarios de EcosimPro, UNED Madrid Feb. 24-25, 2003.*
Honeywell, "ProfitMax, ProfitSensorPRo, Profit NLC", Mar. 2006, pp. 8.*
Honeywell, "Profit controller", Mar. 2006, pp. 2.*
Honeywell, Performance multivariable MD version 3.0 User's manual, Jun. 2003, pp. 309.*

(Continued)

Primary Examiner — Albert DeCady
Assistant Examiner — Olvin Lopez Alvarez

(57) ABSTRACT

A method includes determining how to adjust one or more manipulated variables using at least one model. The one or more manipulated variables are associated with a sugar dryer. The method also includes generating one or more control signals to control one or more controlled variables associated with the sugar dryer. The one or more controlled variables include an outfall temperature associated with the sugar dryer, and the one or more manipulated variables include a rate at which wet material is provided to the sugar dryer. The sugar dryer could include multiple sugar dryers. At least two of the sugar dryers could operate using different fuels. The one or more control signals could be generated to control the rates at which the wet material is provided to the multiple sugar dryers based on costs associated with the different fuels.

21 Claims, 7 Drawing Sheets

OTHER PUBLICATIONS

Paul S. Fountain, "Apparatus and Method for Optimizing a Liquefied Natural Gas Facility", U.S. Appl. No. 11/708,957, filed Feb. 21, 2007.
"Making Sugar", Western Sugar, May 19, 2008, pp. 1-4.
"Sugarbeet Processing", Emission Factor Documentation for AP-42, Section 9.10.1.2, Mar. 1997, 50 pages, see esp. pp. 2-1 through 2-6.

* cited by examiner

Honeywell Profit Controller (RMPCT)

| CONTROLLER DETAIL | | ON | OFF | WARM | APP MENU | OPTIONS | STATUS MSGS | REPORTS |
|---|---|---|---|---|---|---|---|---|
| CV SUMMARY | CV DETAIL | CV OPTIMIZE | | CV CONTROL | | CV PROCESS | CV ADV TUNING | GAIN DELAY |
| MV SUMMARY | MV DETAIL | MV OPTIMIZE | | MV CONTROL | | MV PROCESS | DV SUMMARY | DV DETAIL |
| | | | | MOVE DOWN | MOVE UP | | MOVE TO TOP | BY CV# |

| MV# | MV DESCRIPTION | STATUS | VALUE | FUTURE | SS VALUE | LO LIMIT | HI LIMIT | SET POINT |
|---|---|---|---|---|---|---|---|---|
| 1 | CV01.PV | GOOD | 0 | 0 | 0 | 0 | 100.0 | |
| 2 | CV02.PV | GOOD | 0 | 0 | 0 | 0 | 100.0 | |
| 3 | CV03.PV | GOOD | 0 | 0 | 0 | 0 | 100.0 | |
| 4 | CV04.PV | GOOD | 0 | 0 | 0 | 0 | 100.0 | |
| 5 | CV05.PV | GOOD | 0 | 0 | 0 | 0 | 100.0 | |
| 6 | CV06.PV | GOOD | 0 | 0 | 0 | 0 | 100.0 | |
| 7 | CV07.PV | GOOD | 0 | 0 | 0 | 0 | 100.0 | |
| 8 | CV08.PV | GOOD | 0 | 0 | 0 | 0 | 100.0 | |
| 9 | CV09.PV | GOOD | 0 | 0 | 0 | 0 | 100.0 | |

FIG. 4A(1)

| | | | | | | | |
|---|---|---|---|---|---|---|---|
| 10 | CV10.PV | GOOD | 0 | 0 | 0 | 0 | 100.0 |
| 11 | CV11.PV | GOOD | 0 | 0 | 0 | 0 | 100.0 |
| 12 | CV12.PV | GOOD | 0 | 0 | 0 | 0 | 100.0 |
| 13 | CV13.PV | GOOD | 0 | 0 | 0 | 0 | 100.0 |
| 14 | CV14.PV | GOOD | 0 | 0 | 0 | 0 | 100.0 |
| 15 | CV15.PV | GOOD | 0 | 0 | 0 | 0 | 100.0 |
| 16 | CV16.PV | GOOD | 0 | 0 | 0 | 0 | 100.0 |
| 17 | CV17.PV | GOOD | 0 | 0 | 0 | 0 | 100.0 |
| 18 | CV18.PV | GOOD | 0 | 0 | 0 | 0 | 100.0 |
| 19 | CV19.PV | GOOD | 0 | 0 | 0 | 0 | 100.0 |
| 20 | CV20.PV | GOOD | 0 | 0 | 0 | 0 | 100.0 |
| 21 | CV21.PV | GOOD | 0 | 0 | 0 | 0 | 100.0 |
| 22 | CV22.PV | GOOD | 0 | 0 | 0 | 0 | 100.0 |
| 23 | CV23.PV | GOOD | 0 | 0 | 0 | 0 | 100.0 |
| 24 | CV24.PV | GOOD | 0 | 0 | 0 | 0 | 100.0 |
| 25 | CV25.PV | GOOD | 0 | 0 | 0 | 0 | 100.0 |
| 26 | CV26.PV | GOOD | 0 | 0 | 0 | 0 | 100.0 |
| 27 | CV27.PV | GOOD | 0 | 0 | 0 | 0 | 100.0 |
| 28 | CV28.PV | GOOD | 0 | 0 | 0 | 0 | 100.0 |
| 29 | CV29.PV | GOOD | 0 | 0 | 0 | 0 | 100.0 |
| 30 | CV30.PV | GOOD | 0 | 0 | 0 | 0 | 100.0 |

| READY | ADMIN | 2/19/2007 | 10:37 AM |

FIG. 4A(2)

APPARATUS AND METHOD FOR OPTIMIZING OPERATION OF SUGAR DRYERS

TECHNICAL FIELD

This disclosure relates generally to control systems and more specifically to an apparatus and method for optimizing operation of sugar dryers.

BACKGROUND

A sugar processing facility typically processes raw material (such as sugar cane) and produces a wide variety of finished products (such as refined or finished sugar, molasses, and animal feed). The animal feed is typically produced by drying pulp and other material in one or more sugar dryers. Control of the sugar dryers is often difficult due to several factors. These factors can include the large number of process variables that affect the operation of the sugar dryers, ever-changing ambient conditions, shifts in active process constraints, and changes in the composition of the material being dried. As a result, the sugar dryers are often run at sub-optimal operation, resulting in a loss of production, excessive energy usage during drying, and/or a monetary loss.

SUMMARY

This disclosure provides an apparatus and method for optimizing operation of sugar dryers.

In a first embodiment, an apparatus includes at least one memory configured to store at least one model. The at least one model is associated with one or more manipulated variables and one or more controlled variables. The one or more manipulated variables and the one or more controlled variables are associated with a sugar dryer. The apparatus also includes at least one processor configured to determine how to adjust the one or more manipulated variables using the at least one model. The one or more controlled variables include an outfall temperature associated with the sugar dryer, and the one or more manipulated variables include a rate at which wet material is provided to the sugar dryer.

In particular embodiments, the sugar dryer includes multiple sugar dryers. Also, the one or more manipulated variables include rates at which the wet material is provided to the sugar dryers. At least two of the sugar dryers could operate using different fuels. Also, the at least one processor could be further configured to control the rates at which the wet material is provided to the sugar dryers based on costs associated with the different fuels.

In other particular embodiments, the one or more controlled variables further include a moisture content associated with dried material leaving the sugar dryer, a flow of fuel used to produce hot gas, a temperature associated with the hot gas, a pressure associated with the hot gas, and/or a quantity of the wet material provided to the sugar dryer.

In yet other particular embodiments, the one or more manipulated variables further include a temperature setpoint associated with hot gas and/or a pressure setpoint associated with the hot gas.

In still other particular embodiments, the at least one model is further associated with one or more disturbance variables. The one or more disturbance variables include a moisture content associated with the wet material and/or an ambient temperature.

In additional particular embodiments, the at least one processor is further configured to generate a user interface for presentation to a user and to receive input from the user. The input is associated with a change to a low limit value, a high limit value, and/or a setpoint associated with one of the controlled and manipulated variables.

In a second embodiment, a method includes determining how to adjust one or more manipulated variables using at least one model. The one or more manipulated variables are associated with a sugar dryer. The method also includes generating one or more control signals to control one or more controlled variables associated with the sugar dryer. The one or more controlled variables include an outfall temperature associated with the sugar dryer, and the one or more manipulated variables include a rate at which wet material is provided to the sugar dryer.

In a third embodiment, a computer program is embodied on a computer readable medium. The computer program includes computer readable program code for determining how to adjust one or more manipulated variables using at least one model. The one or more manipulated variables are associated with a sugar dryer. The computer program also includes computer readable program code for generating one or more control signals to control one or more controlled variables associated with the sugar dryer. The one or more controlled variables include an outfall temperature associated with the sugar dryer, and the one or more manipulated variables include a rate at which wet material is provided to the sugar dryer.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
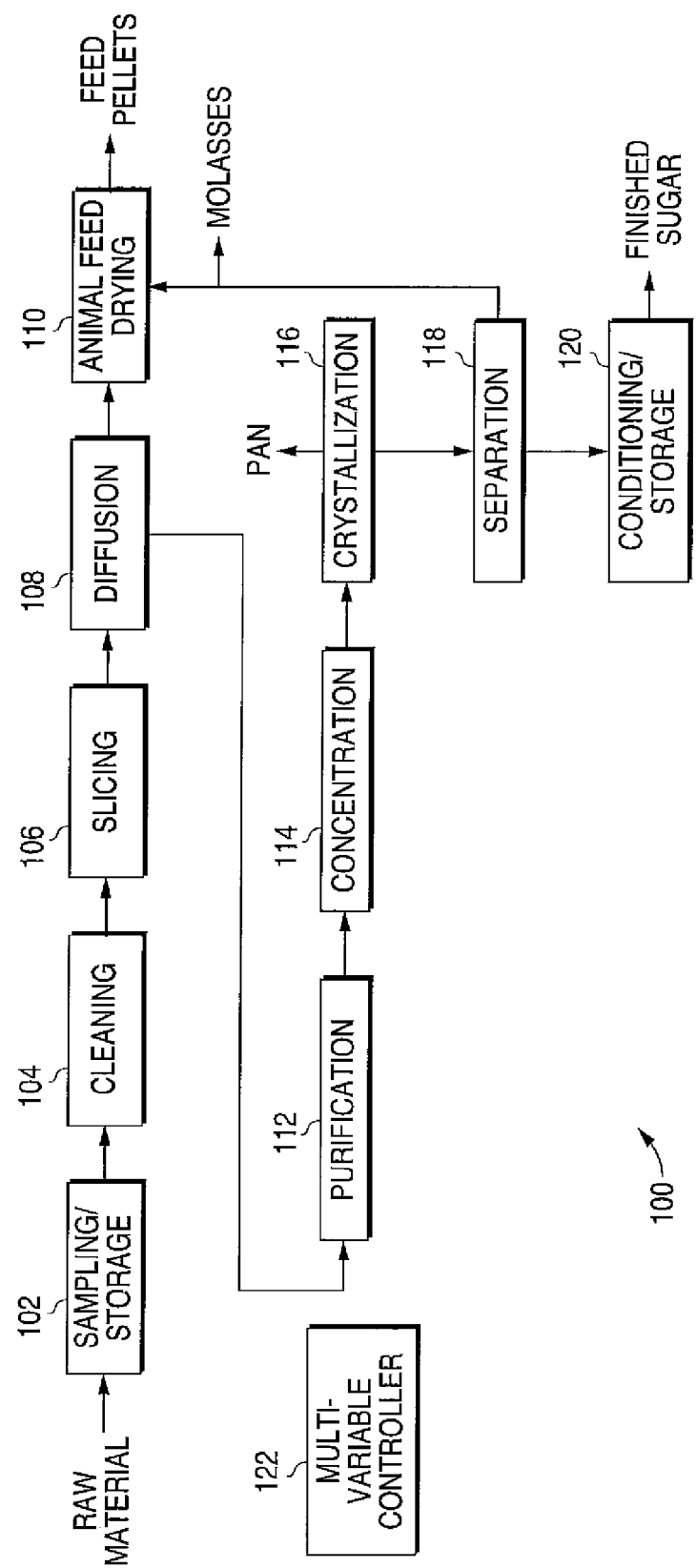
FIG. 1 illustrates an example sugar processing facility according to this disclosure.

FIG. 1 illustrates an example sugar processing facility 100 according to this disclosure. The embodiment of the sugar processing facility 100 shown in FIG. 1 is for illustration only. Other embodiments of the sugar processing facility 100 could be used without departing from the scope of this disclosure.

In this example embodiment, the sugar processing facility 100 includes processing equipment for processing raw material (such as sugar cane) to produce one or more finished products (such as refined sugar, molasses, and animal feed).

The processing equipment shown in FIG. 1 represents one possible implementation of a sugar processing facility. Other types of sugar processing facilities having other or additional processing equipment or having processing equipment in a different configuration could also be used.

In this example, the sugar processing facility 100 includes a sampling/storage unit 102. The sampling/storage unit 102 receives raw material such as sugar cane and stores the raw material. The sampling/storage unit 102 also samples the raw material to determine various characteristics of the raw material.

The raw material from the sampling/storage unit 102 is provided to a cleaning unit 104. The cleaning unit 104 generally prepares the raw material for further processing, such as by removing undesired components from the raw material. The cleaning unit 104 could, for example, include stone catchers, weed catchers, and watering screens.

The cleaned raw material is cut in a slicing unit 106. The slicing unit 106 cuts the raw material into small pieces for further processing, such as by cutting the raw material into triangular shreds or slices. The slicing unit 106 could, for example, include a beet hopper and slicers.

The cut raw material is provided to a diffusion unit 108. Among other things, the diffusion unit 108 extracts sugar juices from the raw materials. The diffusion unit 108 then passes pulp to an animal feed drying unit 110 and passes process sugars and raw juices to a purification unit 112.

The animal feed drying unit 110 helps to dry the pulp and other material and to produce dried material suitable for storage and shipment. The animal feed drying unit 110 typically dries the pulp and other material to a desired level, and the dried material is then exported in pellet or other form. The animal feed drying unit 110 could, for example, include pulp presses, pulp dryers, and pelleting units.

The purification unit 112 generally purifies the process sugars and raw juices, such as by removing impurities. The purification unit 112 may also help to eliminate an excess of lime by bubbling in carbon dioxide gas to produce light juice. The purification unit 112 could, for example, include a lime kiln, a lime slaker, a milk of lime tank, and a first carb tank. The purification unit 112 could also include a clarifier and a filter for outputting lime. The purification unit 112 could further include a second carb tank and a filter for removing precipitates.

Filtered light juice from the purification unit 112 is concentrated in a concentration unit 114. The concentration unit 114 could, for example, include multiple evaporators that produce concentrated liquor or thick juice. The concentration unit 114 may also include a boiler, alternator, and turbine for producing steam used by the evaporators. The concentrated liquor or thick juice could then be stored in one or more storage tanks.

A crystallization unit 116 and a separation unit 118 operate on high raw sugar and the thick juice. For example, the crystallization unit 116 could include a dissolver that dilutes and melts the high raw sugar with the thick juice, and the resulting material is filtered. The material can then move to a white pan in the crystallization unit 116, which boils and crystallizes the material to produce "white massecuite." The white massecuite then moves to white centrifugal machines in the separation unit 118, which separate sugar crystals from liquors containing sugar syrups and impurities. Other pans in the crystallization unit 116 (such as a high-raw pan and a low-raw pan) and other centrifugal machines in the separation unit 118 can be used to separate sugar crystals from syrup and impurities. Some of the syrup and impurities can be provided as molasses, which can be stored and exported. The remainder can be provided to the animal feed drying unit 110.

The separated sugar crystals are provided to a conditioning/storage unit 120, which can further spin, wash, dry, and cool the crystals. The result is finished sugar, which can be stored in bulk sugar bins or sent to warehouses for packaging.

A multi-variable controller 122 controls the operation of the facility 100 or a portion thereof. The controller 122 may, for example, make automatic process adjustments to control and optimize one or more dryers in the animal feed drying unit 110. The controller 122 may read multiple process values including independent variables (manipulated and disturbance variables) and dependent variables (controlled variables). In general, the facility 100 or a portion thereof is associated with "process variables," which represent various aspects of the facility 100 or a portion thereof (such as temperatures and flow rates). The controller 122 may operate by attempting to maintain a "controlled variable" (CV) at or near a desired value or within a desired operating range. The controller 122 attempts to maintain the controlled variable by altering one or more "manipulated variables" (MVs), such as an opening of a valve or a speed of a motor. A "disturbance variable" (DV) represents a process variable that affects a controlled variable, where the disturbance variable can be considered by the controller 122 but generally cannot be controlled by the controller 122 (such as ambient temperature). By controlling certain controlled variables, the controller 122 may optimize the process performed by the facility 100 or a portion thereof.

The controller 122 may use one or more mathematical models of the process being controlled. The models relate the independent variables (manipulated and disturbance variables) to the dependent variables (controlled variables). The models can be developed during the design of the controller 122, such as by using step test data. The models are then used by the controller 122 to control the process when the controller 122 goes on-line or is activated. For example, the controller 122 may use the models to predict the future values of the controlled variables and to calculate and implement adjustments to the manipulated variables to maintain the controlled variables within their defined limits. The controller 122 may also use the models to keep the facility 100 or a portion thereof running at maximum capacity and optimum conditions.

The proper selection of controlled manipulated, and disturbance variables may be important or critical to the performance of the controller 122. Examples of these types of variables are provided below. The controller 122 could also operate at any suitable frequency in the facility 100. For example, the controller 122 could operate at a 30-second interval. During each interval, the controller 122 can be used to make automatic process adjustments to control and optimize the process.

Figure 3:
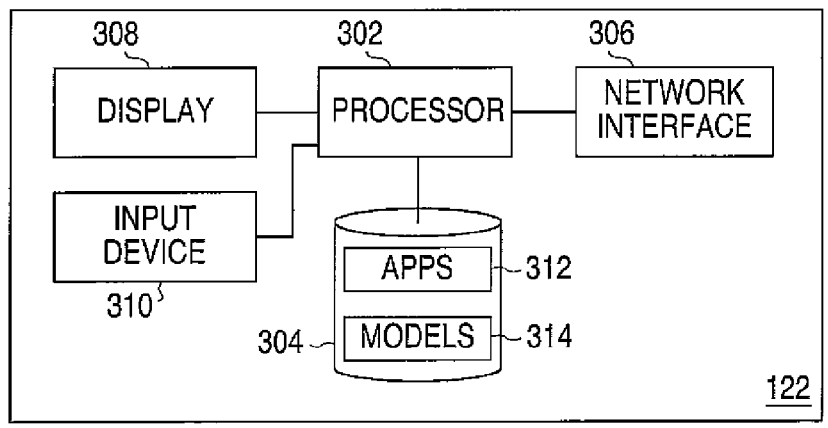
FIG. 3 illustrates an example multi-variable controller for optimizing operation of sugar dryers according to this disclosure.

The controller 122 includes any hardware, software, firmware, or combination thereof for controlling the facility 100 or a portion thereof. The controller 122 could, for example, include one or more processors and one or more memories storing data and instructions (such as models of the facility 100) used, generated, or collected by the processor(s). As a particular example, the controller 122 could represent a controller implemented using PROFIT CONTROLLER from HONEYWELL INTERNATIONAL INC. (previously known as Robust Multivariable Predictive Control Technology or "RMPCT"). One example embodiment of the controller 122 is shown in FIG. 3, which is described below.

Although FIG. 1 illustrates one example of a sugar processing facility 100, various changes could be made to FIG. 1.

For example, other or additional processing equipment could be used in any suitable configuration or arrangement to process sugar. Also, the functional division shown in FIG. 1 is for illustration only. Various components in FIG. 1 could be combined, subdivided, or omitted and additional components could be added according to particular needs. In addition, FIG. 1 illustrates one example operational environment in which the controller 122 could be used. The controller 122 could be used with any other suitable sugar processing facility.

Figure 2A:
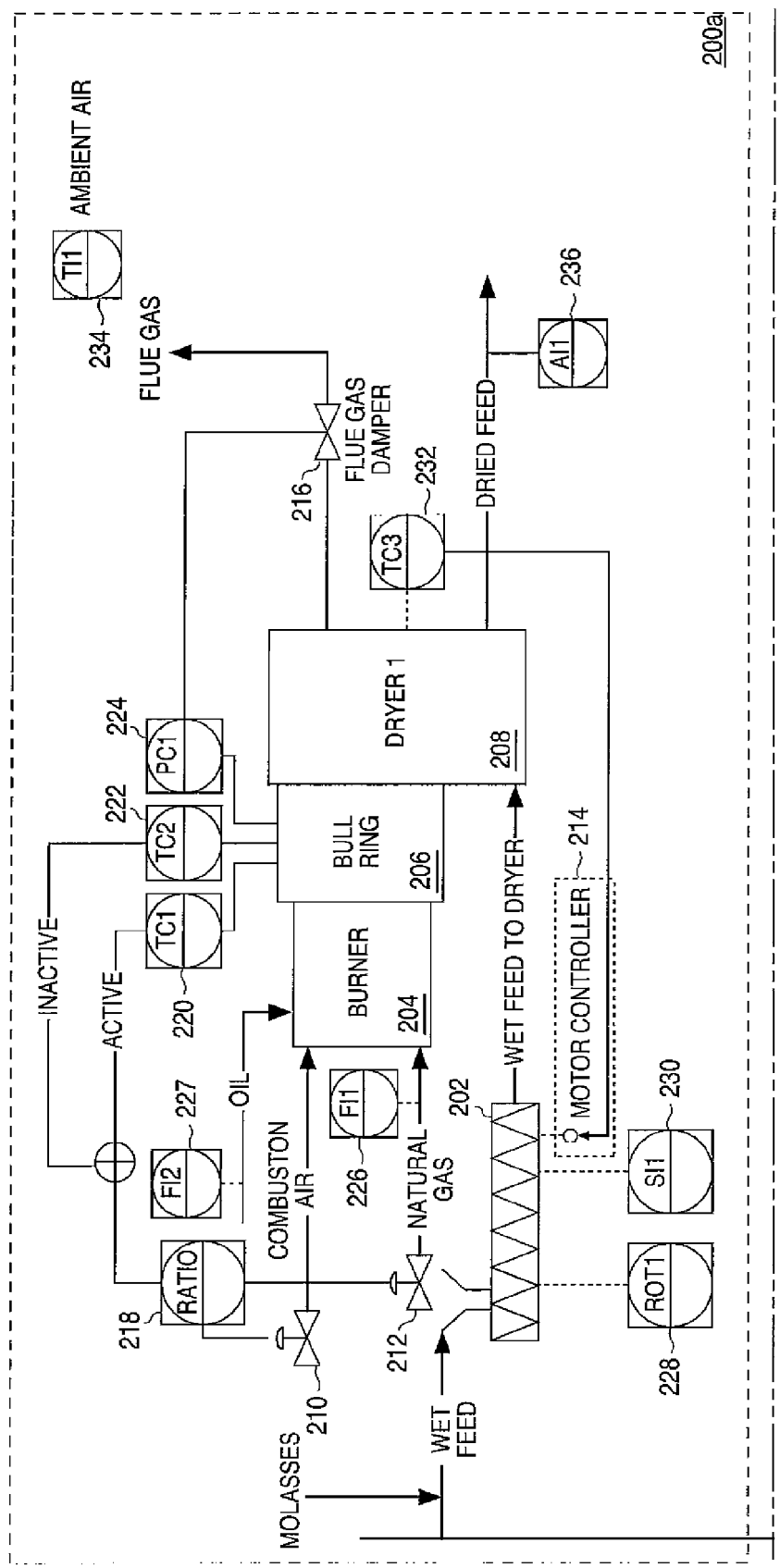
FIG. 2 illustrates example sugar dryers in a sugar processing facility according to this disclosure.
Figure 2B:
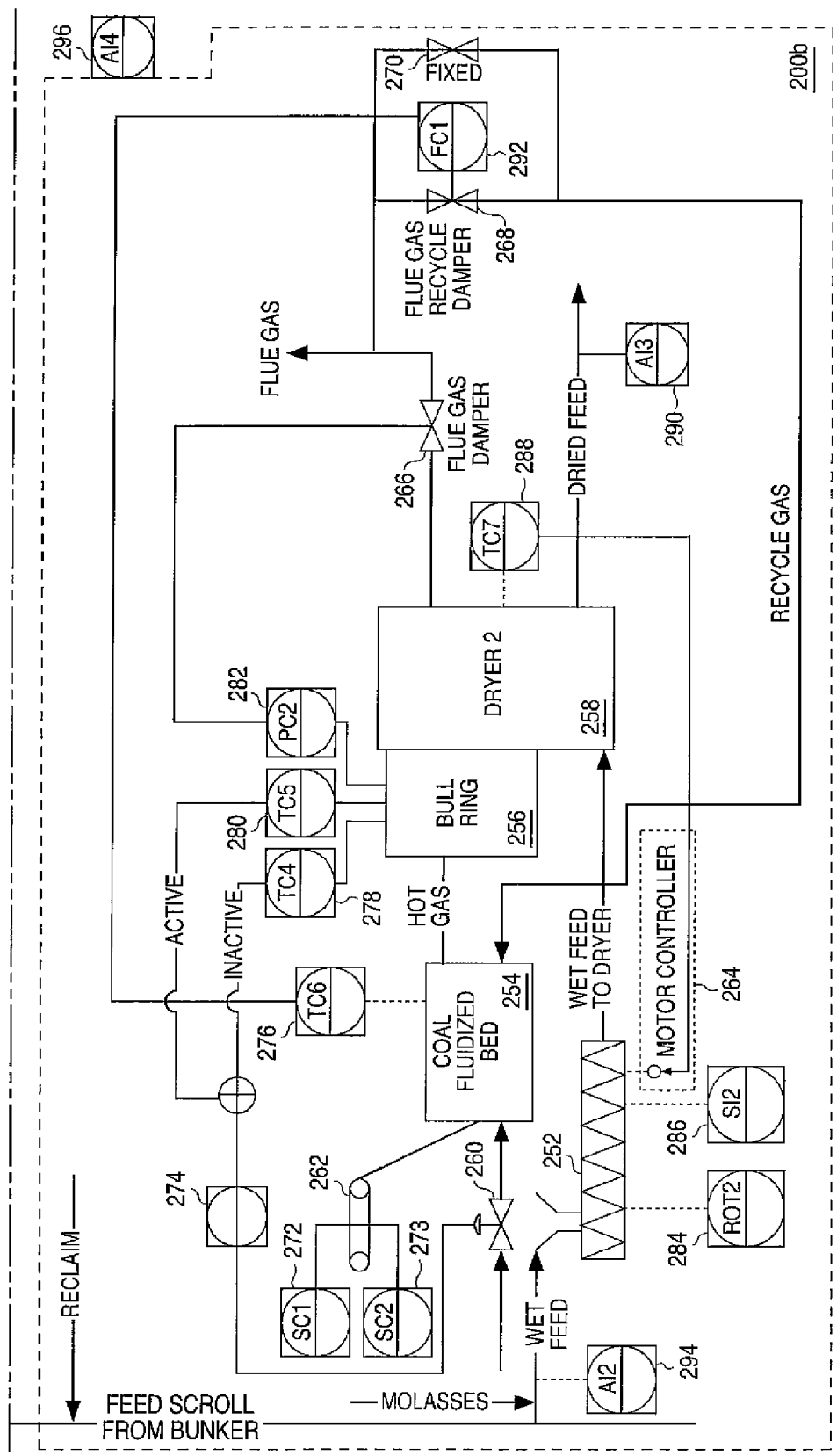

FIG. 2 illustrates example sugar dryers 200a-200b in a sugar processing facility according to this disclosure. The embodiments of the sugar dryers 200a-200b shown in FIG. 2 are for illustration only. Other embodiments of the sugar dryers 200a-200b could be used without departing from the scope of this disclosure.

In this example, the sugar dryers 200a-200b operate using different fuels. The sugar dryer 200a operates using a fuel gas (such as natural gas) or oil. The sugar dryer 200a in this example includes a screw feeder 202, a burner 204, a bull ring 206, and a dryer 208. The screw feeder 202 feeds wet material to be dried to the dryer 208. The burner 204 burns natural gas or oil to produce heat for the dryer 208. The bull ring 206 couples the burner 204 to the dryer 208, allowing hot gas to move from the burner 204 into the dryer 208. The dryer 208 dries the material provided by the screw feeder 202 to produce dried feed.

A valve 210 controls the flow of combustion air into the burner 204, and a valve 212 controls the flow of natural gas into the burner 204. A motor controller 214 controls the rotational speed of the screw feeder 202, thereby controlling the rate that wet material is fed into the dryer 208. A valve 216 controls the flow of flue gas into a gas damper.

Various sensors and other components are used in the sugar dryer 200a. For example, a ratio controller 218 adjusts the valves 210-212 to control the ratio of gas and combustion air entering the burner 204. Temperature sensors 220-222 measures the temperature of the hot gas being provided to the dryer 208 through the bull ring 206. The temperature sensors 220-222 could, for example, represent a redundant pair of sensors (where one is active at a given time). A pressure sensor 224 measures the pressure within the bull ring 206. A flow sensor 226 measures the flow rate of the natural gas entering the burner 204, and a flow sensor 227 measures the flow rate of the oil entering the burner 204. A rotational sensor 228 measures the rotational speed of the screw feeder 202, and a speed (amp) sensor 230 measures the speed of the screw feeder 202. A temperature sensor 232 measures the temperature at an output of the dryer 208 (called an outfall temperature), and a temperature sensor 234 measures the ambient air temperature. An analyzer 236 analyzes one or more characteristics of the dried material leaving the dryer 208, such as a moisture content of the dried material.

The sugar dryer 200b operates using coal. The sugar dryer 200b in this example includes a screw feeder 252, a coal fluidized bed 254, a bull ring 256, and a dryer 258. The screw feeder 252 feeds wet material to be dried to the dryer 258. The coal fluidized bed 254 allows coal to be combusted, producing hot gas for the dryer 258. The bull ring 256 provides the hot gas from the coal fluidized bed 254 to the dryer 258, and the dryer 258 dries the wet material provided by the screw feeder 252.

A valve 260 controls the flow of combustion air into the coal fluidized bed 254. One or more conveyor belts 262 provide coal to the coal fluidized bed 254 for combustion. A motor controller 264 controls the rotational speed of the screw feeder 252, and a valve 266 controls the flow of flue gas into a gas damper. Two valves 268-270 support the capture of flue gas to be recycled into the coal fluidized bed 254.

Various sensors and other components are used in the sugar dryer 200b. For example, sensors 272-273 measure a flow of coal into the coal fluidized bed 254. Multiple sensors may be useful, for example, when multiple conveyor belts 262 are used. A controller 274 controls the valve 260 to control the amount of combustion air entering the coal fluidized bed 254, and a temperature sensor 276 measures the temperature in the coal fluidized bed 254. Temperature sensors 278-280 measure the temperature of the hot gas being provided to the dryer 258 through the bull ring 256 and could represent a redundant sensor pair. A pressure sensor 282 measures the pressure within the bull ring 256. A rotational sensor 284 measures the rotational speed of the screw feeder 252, and a speed (amp) sensor 286 measures the speed of the screw feeder 252. A temperature sensor 288 measures the temperature at an output of the dryer 258. An analyzer 290 analyzes one or more characteristics of the dried material leaving the dryer 258, such as a moisture content of the dried material. A flow controller 292 controls the valve 268 to control the recycling of flue gas into the coal fluidized bed 254.

An analyzer 294 analyzes one or more characteristics of the wet material being fed to both of the sugar dryers 200a-200b, such as by measuring a moisture content of the wet material being fed to the sugar dryers 200a-200b. In addition, the dried feeds from both of the dryers 208 and 258 can be mixed in a later stage of the animal feed drying unit 110. An analyzer 296 analyzes one or more characteristics of the mixed material from both of the sugar dryers 200a-200b, such as by measuring a moisture content of the mixed material.

As described in more detail below, various ones of these sensors and analyzers could be used to provide data to the multi-variable controller 122. Also, the multi-variable controller 122 could control one or more of these controllers to modify the operation of the sugar dryers 200a-200b. Among other things, this may allow the multi-variable controller 122 to adjust the operation of the sugar dryers 200a-200b so that the sugar dryers 200a-200b operate more efficiently or more inexpensively.

Although FIG. 2 illustrates examples of sugar dryers 200a-200b in a sugar processing facility, various changes may be made to FIG. 2. For example, a sugar processing facility could include any number of sugar dryers, including a single sugar dryer. Also, the sugar dryer(s) in the sugar processing facility could operate using any suitable fuel(s). If multiple sugar dryers are used in the sugar processing facility, the sugar dryers may or may not operate using different fuels.

FIG. 3 illustrates an example multi-variable controller 122 for optimizing operation of sugar dryers according to this disclosure. The embodiment of the multi-variable controller 122 shown in FIG. 3 is for illustration only. Other embodiments of the multi-variable controller 122 could be used without departing from the scope of this disclosure. Also, for ease of explanation, the multi-variable controller 122 is described as being used in the sugar processing facility 100 of FIG. 1. The multi-variable controller 122 could be used in any other suitable facility or system.

In this example embodiment, the multi-variable controller 122 includes a processor 302, a memory 304, a network interface 306, a display 308, and an input device 310. The processor 302 represents any suitable processing device, such as a microprocessor, digital signal processor, application-specific integrated circuit, or other logic device. The memory 304 represents any suitable volatile and/or non-volatile storage and retrieval device or devices, such as RAM or ROM. The network interface 306 represents any suitable interface for facilitating communication over a network, such as an Ethernet interface or other electrical signal line or wireless interface. The network interface 306 could, for example, receive measurement data identifying the current values of the controlled variables and output control signals for adjusting the manipulated variables. The display 308 represents any suitable display for presenting information to a user. The input device 310 represents any suitable device or devices for providing input to the processor 302 from the user, such as a keyboard or mouse.

In this example, the memory 304 includes one or more software applications 312 and one or more models 314. The one or more software applications 312 represent one or more computer programs defining how the multi-variable controller 122 controls the sugar dryers 200a-200b in the sugar processing facility 100. For example, the software applications 312 could use the models 314 to analyze input data (such as measurements of different controlled variables) to generate output signals (such as control signals for adjusting the manipulated variables).

The one or more models 314 define relationships between the manipulated and disturbance variables and the controlled variables. The models 314 are used by the multi-variable controller 122 to control the sugar dryers 200a-200b. In particular embodiments, each model 314 could associate a single manipulated or disturbance variable to a single controlled variable.

As part of the control of the sugar dryers 200a-200b, the multi-variable controller 122 could use the models 314 to make adjustments to manipulated variables so that controlled variables are maintained within specified limits. The multi-variable controller 122 could also adjust the operation of the sugar dryers 200a-200b so that certain process objectives are met. As examples, the process objectives could include processing a maximum amount of material with a minimum or cheapest amount of fuel. The process objectives could also include using the sugar dryers 200a-200b to different extents based on the costs of different fuels (such as by using the sugar dryer 200a more when natural gas or oil costs less than coal).

As noted above, the proper selection of controlled, manipulated, and disturbance variables may be important or critical to the performance of the multi-variable controller 122. In particular embodiments, the multi-variable controller 122 may treat the variables identified in Table 1 as controlled variables, the variables identified in Table 2 as manipulated variables, and the variables identified in Table 3 as disturbance variables. The tables include, for each variable, an index number, a tag name, a description, and an engineering unit. Each tag name includes an indication of whether the variable is a process value (PV) (a current measurement in the facility), an output value (OP) (a value provided to a controller), or a setpoint (SP) (a setpoint value provided to a controller). One or more of these variables may represent "calculated variables," which represent variables calculated using the values of other variables.

TABLE 1

| CV# | Tag | Description | Units |
|---|---|---|---|
| 1 | CV01.PV | Results from combined product analyzer (analyzer 296) | % |
| 2 | CV02.PV | Inferential value of moisture of dried material leaving dryer 208 (from analyzer 236) | % |
| 3 | CV03.PV | Outfall temperature of dryer 208 (from sensor 232) | ° C. |
| 4 | CV04.PV | Oil flow into burner 204 (from sensor 227) | T/hr |

TABLE 1-continued

| CV# | Tag | Description | Units |
|---|---|---|---|
| 5 | CV05.PV | Gas flow into burner 204 (from sensor 226) | T/hr |
| 6 | CV06.PV | Temperature valve position of bull ring 206 (from sensors 220-222) | % |
| 7 | CV07.PV | Pressure valve position of bull ring 206 (from sensor 224) | % |
| 8 | CV08.PV | Inferential value for moisture of dried material leaving dryer 258 (from analyzer 290) | ° C. |
| 9 | CV09.PV | Outfall temperature of dryer 258 (from sensor 288) | % |
| 10 | CV10.PV | Flow of coal into coal fluidized bed 254 (from sensor 272) | T/hr |
| 11 | CV11.PV | Flow of coal into coal fluidized bed 254 (from sensor 273) | T/hr |
| 12 | CV12.PV | Temperature valve position of bull ring 256 (from sensors 278-280) | % |
| 13 | CV13.PV | Pressure valve position of bull ring 256 (from sensor 282) | % |
| 14 | CV14.PV | Total combined amount of dried feed (calculated value) | T/hr |

TABLE 2

| MV# | Tag | Description | Units |
|---|---|---|---|
| 1 | MV01.OP | Speed of screw feeder 202 | % |
| 2 | MV02.SP | Setpoint of temperature in bull ring 206 | ° C. |
| 3 | MV03.SP | Setpoint of pressure in bull ring 206 | Barg |
| 4 | MV04.OP | Speed of screw feeder 252 | % |
| 5 | MV05.SP | Setpoint of temperature in bull ring 256 | ° C. |
| 6 | MV06.SP | Setpoint of pressure in bull ring 256 | Barg |

TABLE 3

| DV# | Tag | Description | Units |
|---|---|---|---|
| 1 | DV01.PV | Moisture content of feed material into dryer 258 (from analyzer 294) | % |
| 2 | DV02.PV | Moisture content of feed material into dryer 208 (from analyzer 294) | % |
| 3 | DV03.PV | Ambient temperature (from sensor 234) | ° C. |

In Table 1, CV02.PV and CV08.PV represent values that can be determined using the analyzers 236 and 290, such as values captured by the analyzers every 30 seconds. These values can be replaced or supplemented by laboratory analyses. The laboratory analyses could, for example, be performed every two hours or at other times using samples of dried material leaving the dryers 208 and 258. The laboratory results could be provided to the multi-variable controller 122, such as through an operator interface. The multi-variable controller 122 could check the results to make sure they are within an expected range of values, filter the results, and reconcile the filtered results with the analyzers' readings taken around the same times as the samples. The multi-variable controller 122 (or the operator) could determine how much weight is placed on the analyzers' readings and how much weight is placed on the laboratory results, and the multi-variable controller 122 could calculate the moisture content of the dried material leaving the dryers 208 and 258 using these weights. This type of approach involves the use of "inferentials." An inferential is based on using one or more process inputs. The on-line analyzers' readings can be used for short-term updates of the model bias to trim the models. The laboratory results can be used for longer-term updates of the models since ultimately the laboratory results often control how the finished product can be sold.

In Table 2, MV01.OP and MV04.OP represent the speed of the screw feeders 202 and 252. The speed of the screw feeders 202 and 252 determines the rate at which wet material is provided to the dryers 208 and 258. As a result, these manipulated variables allow the multi-variable controller 122 to control the rate at which wet material is provided to the dryers 208 and 258.

In Table 3, the analyzer 294 is used to provide the moisture content of the wet material entering both dryers 208 and 258. However, due to its position (along a path into the screw feeder 252 in the sugar dryer 200b), this disturbance variable could be dropped from use by the multi-variable controller 122 when the sugar dryer 200b is not in use. A conventional IF-THEN-ELSE statement could be used here to drop the disturbance variable from use by the multi-variable controller 122. Operator input could be required to re-include this disturbance variable for use by the multi-variable controller 122, such as to ensure that the sugar dryer 200b is on-line and that it is safe to use this disturbance variable. Note that this is for illustration only, and separate analyzers could be used for the dryers 208 and 258.

It may also be noted that other or additional variables could be used to control the operation of the sugar dryers 200a-200b. For example, a subset of the variables in Tables 1-3 could be used by the multi-variable controller 122. As a particular example, the multi-variable controller 122 could operate using the following subset of variables: CV03.PV, CV09.PV, MV01.OP, MV04.OP, DV01.PV, DV02.PV, and DV03.PV.

Using the controlled, manipulated, and disturbance variables defined above in Tables 1 through 3, models 314 can be constructed of the sugar dryers 200a-200b. These models 314 could be generated, for example, using step-test data involving the sugar dryers 200a-200b. Tables 4 through 8 below identify example models 314 that could associate controlled variables to manipulated or disturbance variables. No relationship (model defined as "Null") may exist between the controlled variables and the manipulated and disturbance variables. The models shown in Tables 4 through 8 are shown in Laplace Transform form. Note that these models are for illustration only and could vary depending on the sugar dryers being controlled.

TABLE 4

| CV: | MV01 | MV02 |
|---|---|---|
| CV01 | $G(s) = 1\frac{1}{2s+1}e^{-0s}$ | NULL |
| CV02 | $G(s) = 10\frac{1}{10s+1}e^{-10s}$ | $G(s) = -0.7\frac{1}{20s+1}e^{-20s}$ |
| CV03 | $G(s) = -0.5\frac{1}{20s+1}e^{-20s}$ | NULL |
| CV04 | $G(s) = -0.1\frac{1}{5s+1}e^{-1s}$ | NULL |
| CV05 | $G(s) = 0.05\frac{1}{5s+1}e^{-1s}$ | NULL |
| CV06 | NULL | NULL |
| CV07 | NULL | $G(s) = -1.2\frac{1}{13.1s^2+16.4s+1}e^{-0s}$ |
| CV08 | NULL | NULL |
| CV09 | NULL | NULL |

TABLE 4-continued

| CV: | MV01 | MV02 |
|---|---|---|
| CV10 | NULL | NULL |
| CV11 | NULL | NULL |
| CV12 | NULL | NULL |
| CV13 | NULL | NULL |
| CV14 | $G(s) = 1\frac{1}{2s+1}e^{-0s}$ | NULL |

TABLE 5

| CV: | MV03 | MV04 |
|---|---|---|
| CV01 | NULL | $G(s) = 1\frac{1}{2s+1}e^{-0s}$ |
| CV02 | NULL | NULL |
| CV03 | $G(s) = -0.4\frac{20s+1}{13s^2+16s+1}e^{-8s}$ | NULL |
| CV04 | NULL | NULL |
| CV05 | NULL | NULL |
| CV06 | $G(s) = 0.15\frac{1}{10s+1}e^{-0s}$ | NULL |
| CV07 | NULL | NULL |
| CV08 | NULL | $G(s) = -0.6\frac{1}{30s+1}e^{-30s}$ |
| CV09 | NULL | $G(s) = 10\frac{1}{10s+1}e^{-10s}$ |
| CV10 | NULL | $G(s) = 0.2\frac{1}{5s+1}e^{-1s}$ |
| CV11 | NULL | $G(s) = 0.2\frac{1}{5s+1}e^{-1s}$ |
| CV12 | NULL | NULL |
| CV13 | NULL | NULL |
| CV14 | NULL | $G(s) = 1\frac{1}{2s+1}e^{-0s}$ |

TABLE 6

| CV: | MV05 | MV06 |
|---|---|---|
| CV01 | NULL | NULL |
| CV02 | NULL | NULL |
| CV03 | NULL | NULL |
| CV04 | NULL | NULL |
| CV05 | NULL | NULL |
| CV06 | NULL | NULL |
| CV07 | NULL | NULL |
| CV08 | NULL | NULL |
| CV09 | $G(s) = -0.7\frac{1}{20s+1}e^{-20s}$ | NULL |
| CV10 | NULL | $G(s) = -0.4\frac{20s+1}{13s^2+16s+1}e^{-8s}$ |
| CV11 | NULL | NULL |
| CV12 | $G(s) = -1.2\frac{1}{13.1s^2+16.4s+1}e^{-0s}$ | NULL |
| CV13 | NULL | $G(s) = 0.15\frac{1}{10s+1}e^{-0s}$ |
| CV14 | NULL | NULL |

TABLE 7

| CV: | DV01 | DV02 |
|---|---|---|
| CV01 | NULL | NULL |
| CV02 | $G(s) = 1\frac{1}{20s+1}e^{-20s}$ | NULL |
| CV03 | NULL | NULL |
| CV04 | NULL | NULL |
| CV05 | NULL | NULL |
| CV06 | NULL | NULL |
| CV07 | NULL | NULL |
| CV08 | NULL | NULL |
| CV09 | NULL | $G(s) = 1\frac{1}{20s+1}e^{-20s}$ |
| CV10 | NULL | NULL |
| CV11 | NULL | NULL |
| CV12 | NULL | NULL |
| CV13 | NULL | NULL |
| CV14 | NULL | NULL |

TABLE 8

| CV: | DV03 |
|---|---|
| CV01 | $G(s) = -0.1\frac{1}{20s+1}e^{-5s}$ |
| CV02 | $G(s) = -0.1\frac{1}{20s+1}e^{-5s}$ |
| CV03 | NULL |
| CV04 | NULL |
| CV05 | NULL |
| CV06 | NULL |
| CV07 | NULL |
| CV08 | NULL |
| CV09 | $G(s) = -0.1\frac{1}{20s+1}e^{-5s}$ |
| CV10 | NULL |
| CV11 | NULL |
| CV12 | NULL |
| CV13 | NULL |
| CV14 | NULL |

Using these models 314, the multi-variable controller 122 can effectively control the controlled variables through adjustments to the manipulated variables. The multi-variable controller 122 can optimize the operation of the sugar dryers 200a-200b using these models 314 and one or more economic optimization approaches. In some embodiments, the multi-variable controller 122 is configured to use either linear program (LP) economics or quadratic program (QP) economics when controlling the sugar dryers 200a-200b. These two economic optimization approaches use a simple minimization strategy, although the quadratic optimization also uses ideal resting values (or desired steady state values). The economics can be defined to meet various objectives. These objectives could include maximizing dried feed production subject to constraints and maximizing dried feed production using the dryer associated with the cheaper fuel (coal, oil, gas, etc.). In particular embodiments, the general form of an objective function could be:

$$\text{Minimize } J = \sum_i b_i \times CV_i + \sum_i a_i^2(CV_i - CV_{0i})^2 + \sum_j b_j \times MV_j + \sum_j a_j^2(MV_j - MV_{0j})^2,$$

where:

$b_i$ represents the linear coefficient of the $i^{th}$ controlled variable;

$b_j$ represents the linear coefficient of the $j^{th}$ manipulated variable;

$a_i$ represents the quadratic coefficient of the $i^{th}$ controlled variable;

$a_j$ represents the quadratic coefficient of the $j^{th}$ manipulated variable;

$CV_i$ represents the actual resting value of the $i^{th}$ controlled variable;

$CV_{0i}$ represents the desired resting value of the $i^{th}$ controlled variable;

$MV_j$ represents the actual resting value of the $j^{th}$ manipulated variable; and $MV_{0j}$ represents the desired resting value of the $j^{th}$ manipulated variable.

As shown here, the optimization may involve a large number of process variables, each able to be incorporated into either a linear or quadratic optimization objective. The multi-variable controller 122 can optimize the controlled variables using this optimization to meet various ones of the objectives described above.

Although FIG. 3 illustrates one example of a multi-variable controller 122 for optimizing operation of sugar dryers, various changes may be made to FIG. 3. For example, the controller 122 could include any other or additional components according to particular needs. Also, while shown as being formed using a computer processing device, the controller 122 could be implemented in any other suitable manner. Further, the multi-variable controller 122 could be used to control one or multiple sugar dryers. In addition, the details provided above (such as the identification of particular controlled, manipulated, and disturbance variables and models 314) are examples only. The multi-variable controller 122 could operate using any other suitable variables and/or models.

FIGS. 4A(1), 4A(2), and 4B illustrate an example user interface 400 for controlling sugar dryers according to this disclosure. The embodiment of the user interface 400 shown in FIGS. 4A(1), 4A(2), and 4B is for illustration only. Other embodiments of the user interface 400 could be used without departing from the scope of this disclosure. Also, the user interface 400 may be provided by the multi-variable controller 122 or any other suitable device or system.

The user interface 400 may support various functions performed or implemented by the multi-variable controller 122. For example, the user interface 400 may allow a user to adjust parameters of different controlled variables, thereby allowing the user to adjust how the multi-variable controller 122 is controlling the sugar dryers 200a-200b.

In this example, the user interface 400 includes control buttons 402, which allow the user to invoke various high-level functions related to the multi-variable controller 122. In this example, the control buttons 402 allow the user to place the multi-variable controller 122 in an on, off, or warm (predicting but not controlling) state. The control buttons 402 also allow the user to view an application menu, set various high-level options, and view status messages or reports.

When the multi-variable controller 122 is activated using the appropriate control button 402, function buttons 404 can be used to invoke particular functions by the user or to display particular information to the user. The information could, for example, be displayed in a display area 406 of the user interface 400.

As shown in FIG. 4A(1) and 4A(2), selection of the "CV Summary" button 404 allows the user to view and configure information associated with the controlled variables. For each controlled variable, the display area 406 includes a numerical index and a description. The display area 406 also includes the status of the controlled variable, indicating whether the controlled variable is being controlled ("good") or not ("drop"). The display area 406 further identifies a current value, a dynamic predicted future value, and a predicted steady-state (SS) value of the controlled variable. In addition, the display area 406 identifies low and high limits and a setpoint for the controlled variable. Using the user interface 400, the user could alter the low limit, high limit, or setpoint for one or more of the controlled variables. The multi-variable controller 122 could then take this information into account when controlling the sugar dryers 200a-200b.

Figure 4B:
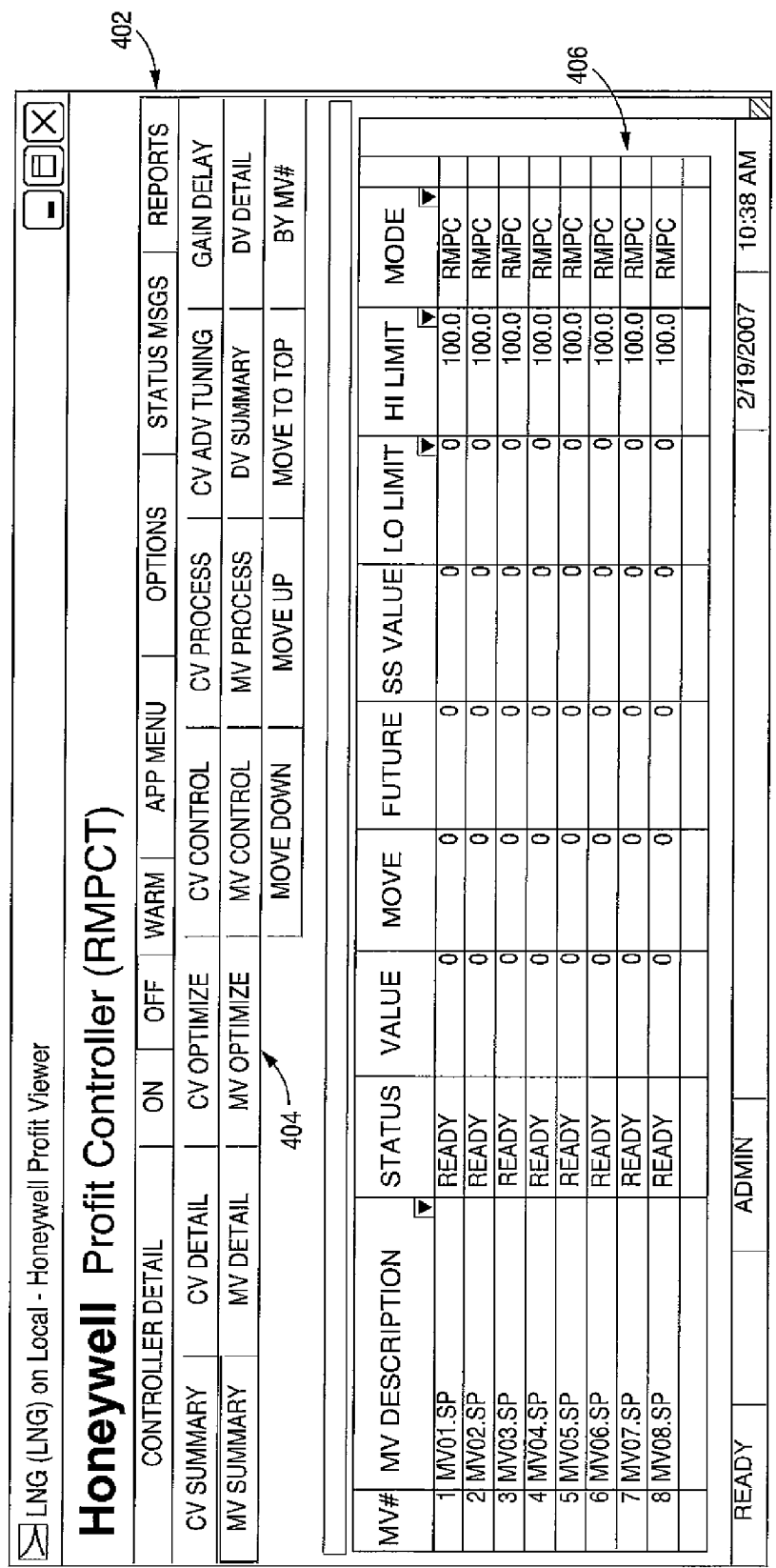
FIGS. 4A(1), 4A(2), and 4B illustrate an example user interface for controlling sugar dryers according to this disclosure.

As shown in FIG. 4B, selection of the "MV Summary" button 404 allows the user to view and configure information associated with the manipulated variables. For each manipulated variable, the display area 406 includes a numerical index and a description. The display area 406 also includes the status of the manipulated variable, indicating whether the manipulated variable is being manipulated ("ready") or not ("serv"). The display area 406 further identifies a current value, a dynamic predicted future value, and a predicted steady-state (SS) value of the manipulated variable. Beyond that, the display area 406 identifies a calculated move or change in the setpoint of the manipulated variable. In addition, the display area 406 identifies low and high limits, a setpoint, and a mode of operation for the manipulated variable. The mode indicates whether the manipulated variable is being controlled manually ("OPR") or by the controller 122 ("RMPC"). Using the user interface 400, the user could alter the low limit, high limit, setpoint, or mode for one or more of the manipulated variables. The multi-variable controller 122 could then Lake this information into account when controlling the sugar dryers 200a-200b.

Although FIGS. 4A(1), 4A(2), and 4B illustrate one example of a user interface 400 for controlling sugar dryers, various changes could be made to FIGS. 4A(1), 4A(2), and 4B. For example, any other or additional user interface could be used. Also, the arrangement and content of the user interface 400 shown in FIGS. 4A(1), 4A(2), and 4B is for illustration only.

Figure 5:
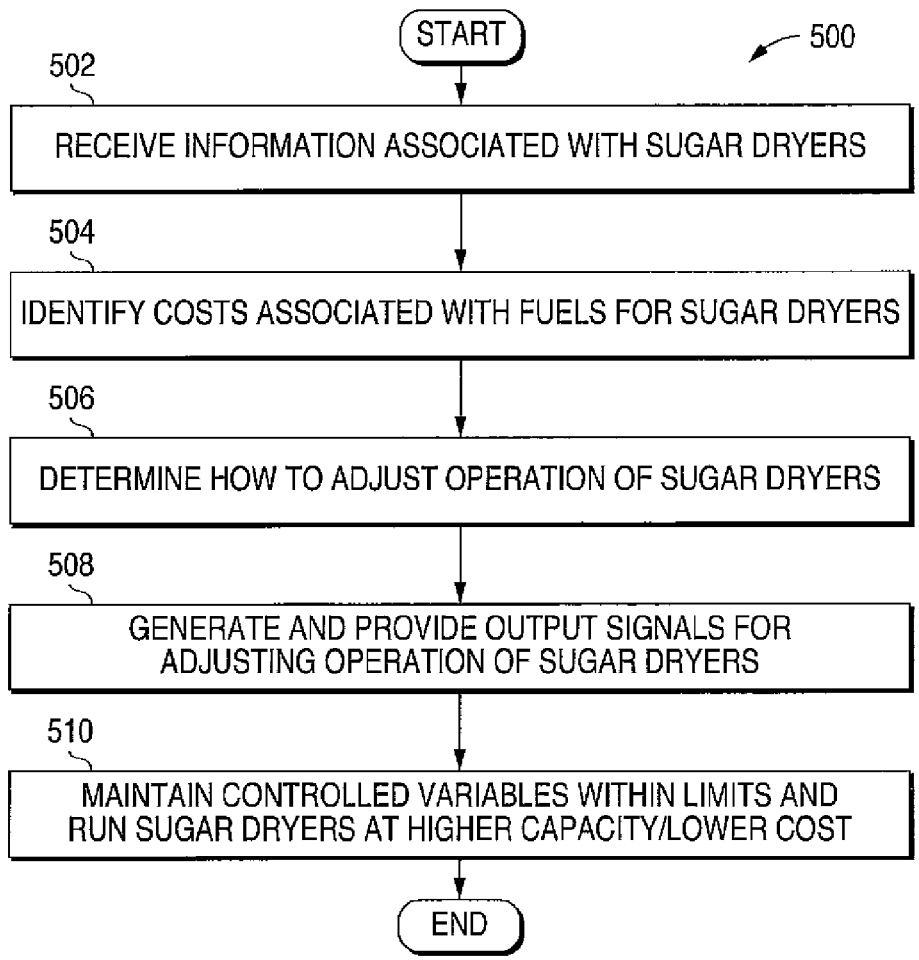
FIG. 5 illustrates an example method for optimizing operation of sugar dryers according to this disclosure.

FIG. 5 illustrates an example method 500 for optimizing operation of sugar dryers according to this disclosure. The embodiment of the method 500 shown in FIG. 5 is for illustration only. Other embodiments of the method 500 could be used without departing from the scope of this disclosure. Also, for ease of explanation, the method 500 is described with respect to the multi-variable controller 122 controlling the sugar dryers 200a-200b in the sugar processing facility 100. The method 500 could be used by any device or system to control any suitable sugar dryers.

Information associated with the operation of one or more sugar dryers is received at step 502. This could include, for example, the multi-variable controller 122 receiving data identifying how certain controlled, manipulated, and disturbance variables are behaving during operation of the sugar dryers 200a-200b in the sugar processing facility 100. The data could be stored in a database or other repository. The controller identifies the costs associated with one or more fuels used by the sugar dryers at step 504. This could include, for example, the multi-variable controller 122 receiving data identifying the costs associated with natural gas, oil, and coal.

The controller determines how to adjust the operation of the sugar dryers at step 506. This may include, for example, the multi-variable controller 122 predicting the future values of one or more controlled variables, such as by analyzing past and current data regarding the controlled variables to estimate the future values of the controlled variables. This may also include the multi-variable controller 122 using the models 314 to determine how to adjust one or more manipulated variables to control the controlled variables. This may further include the multi-variable controller 122 considering the values of one or more disturbance variables.

The controller generates one or more output signals that are provided to the sugar dryers at step 508. This may include, for example, the multi-variable controller 122 outputting control signals to adjust valves and other components in the sugar dryers 200a-200b. This can be done to alter valve positions, temperatures, flow rates, or other manipulated variables in the sugar dryers 200a-200b. This can also be done to adjust the amount of fuel (such as gas, oil, or coal) provided to the sugar dryers 200a-200b. These changes may have corresponding effects on the controlled variables being monitored in the sugar dryers 200a-200b.

In this way, the controller is able to maintain the controlled variables within their specified limits while also running the sugar dryers at a higher capacity and lower cost at step 510. This may include, for example, the multi-variable controller 122 adjusting the manipulated variables so that the controlled variables stay within their limits. This may also include the multi-variable controller 122 determining how to adjust the manipulated variables to increase the amount of material dried by the sugar dryers 200a-200b while reducing or minimizing the costs associated with operation of the sugar dryers 200a-200b, such as by using LP or OP economics.

Although FIG. 5 illustrates one example of a method 500 for optimizing operation of sugar dryers, various changes may be made to FIG. 5. For example, while shown as a series of steps, various steps in FIG. 5 could overlap, occur in parallel, or occur in a different order. Also, various steps in FIG. 5 could be repeated, such as when the multi-variable controller 122 performs steps 502-508 at a 30-second or other specified interval.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
at least one memory configured to store at least one model, the at least one model associated with manipulated variables and controlled variables, the manipulated variables and the controlled variables associated with multiple sugar dryers that operate using different fuels and that operate in parallel such that each sugar dryer can process wet material independent of one or more other sugar dryers; and
at least one processor configured to determine how to adjust the manipulated variables using the at least one model;
wherein the controlled variables include outfall temperatures associated with the sugar dryers;
wherein the manipulated variables include rates at which the wet material is provided to the sugar dryers;
wherein the at least one processor is configured to control the outfall temperature of each sugar dryer based on the rate at which the wet material is provided to that sugar dryer; and
wherein the at least one processor is configured to use an economic optimization to control the rates at which the wet material is provided to the sugar dryers based on different costs associated with the different fuels.

2. The apparatus of claim 1, wherein the at least one processor is configured to use the economic optimization in order to utilize the multiple sugar dryers to different extents based on the different costs associated with the different fuels.

3. The apparatus of claim 2, wherein the at least one processor is configured to use the economic optimization in order to maximize production of dried material using the sugar dryer associated with a cheaper fuel.

4. The apparatus of claim 1, wherein the controlled variables further include at least one of: a moisture content associated with dried material leaving at least one of the sugar dryers, a flow of fuel used to produce a hot gas for at least one of the sugar dryers, a temperature associated with the hot gas, a pressure associated with the hot gas, and a quantity of the wet material provided to at least one of the sugar dryers.

5. The apparatus of claim 1, wherein the manipulated variables further include a temperature setpoint associated with a hot gas for at least one of the sugar dryers.

6. The apparatus of claim 1, wherein the at least one model is further associated with one or more disturbance variables, the one or more disturbance variables including at least one of: a moisture content associated with the wet material, and an ambient temperature.

7. The apparatus of claim 1, wherein the economic optimization comprises one of: a linear program economic optimization and a quadratic program economic optimization.

8. The apparatus of claim 1, wherein the at least one processor is further configured to generate a user interface for presentation to a user and to receive input from the user, the input associated with a change to at least one of: a low limit value, a high limit value, and a setpoint associated with one of the controlled and manipulated variables.

9. A method comprising:
determining how to adjust manipulated variables using at least one model, the manipulated variables associated with multiple sugar dryers that operate using different fuels and that operate in parallel such that each sugar dryer can process wet material independent of one or more other sugar dryers; and
generating control signals to control controlled variables associated with the sugar dryers;
wherein the controlled variables include outfall temperatures associated with the sugar dryers;
wherein the manipulated variables include rates at which the wet material is provided to the sugar dryers;
wherein determining how to adjust the manipulated variables comprises determining how to control the outfall temperature of each sugar dryer based on the rate at which the wet material is provided to that sugar dryer; and
wherein determining how to adjust the manipulated variables further comprises using an economic optimization to control the rates at which the wet material is provided to the sugar dryers based on different costs associated with the different fuels.

10. The method of claim 9, wherein using the economic optimization to control the sugar dryers comprises using the economic optimization in order to utilize the multiple sugar dryers to different extents based on the different costs associated with the different fuels.

11. The method of claim 10, wherein using the economic optimization in order to utilize the multiple sugar dryers to different extents comprises using the economic optimization in order to maximize production of dried material using the sugar dryer associated with a cheaper fuel.

12. The method of claim 9, wherein the controlled variables further include at least one of: a moisture content associated with dried material leaving at least one of the sugar dryers, a flow of fuel used to produce a hot gas for at least one of the sugar dryers, a temperature associated with the hot gas, a pressure associated with the hot gas, and a quantity of the wet material provided to at least one of the sugar dryers.

13. The method of claim 9, wherein the manipulated variables further include a temperature setpoint associated with a hot gas for at least one of the sugar dryers.

14. The method of claim 9, wherein the at least one model is further associated with one or more disturbance variables, the one or more disturbance variables including at least one of: a moisture content associated with the wet material, and an ambient temperature.

15. The method of claim 9, wherein the economic optimization comprises one of: a linear program economic optimization and a quadratic program economic optimization.

16. The method of claim 9, further comprising:
presenting a user interface to a user; and
receiving input from the user, the input associated with a change to at least one of: a low limit value, a high limit value, and a setpoint associated with one of the controlled and manipulated variables;
wherein generating the control signals comprises generating the control signals based on at least one of: the low limit value, the high limit value, and the setpoint.

17. The method of claim 9, further comprising outputting the control signals to the sugar dryers.

18. A non-transitory computer readable medium embodying a computer program, to be executed by a sugar dryer controller, the computer program comprising:
computer readable program code for determining how to adjust manipulated variables using at least one model, the manipulated variables associated with multiple sugar dryers that operate using different fuels and that operate in parallel such that each sugar dryer can process wet material independent of one or more other sugar dryers; and
computer readable program code for generating control signals to control controlled variables associated with the sugar dryers;
wherein the controlled variables include outfall temperatures associated with the sugar dryers;
wherein the manipulated variables include rates at which the wet material is provided to the sugar dryers;
wherein the computer readable program code for determining how to adjust the manipulated variables comprises computer readable program code for determining how to control the outfall temperature of each sugar dryer based on the rate at which the wet material is provided to that sugar dryer; and
wherein the computer readable program code for determining how to adjust the manipulated variables further comprises computer readable program code for using an economic optimization to control the rates at which the wet material is provided to the sugar dryers based on different costs associated with the different fuels.

19. The computer readable medium of claim 18, wherein the computer readable program code for using the economic optimization to control the sugar dryers comprises computer readable program code for using the economic optimization in order to utilize the multiple sugar dryers to different extents based on the different costs associated with the different fuels.

20. The computer readable medium of claim 19, wherein the computer readable program code for using the economic optimization to utilize the multiple sugar dryers to different extents comprises computer readable program code for using the economic optimization in order to maximize production of dried material using the sugar dryer associated with a cheaper fuel.

21. The method of claim 9, wherein determining how to adjust the manipulated variables further comprises determining how to control the outfall temperature each of sugar dryer based on (ii) a pressure setpoint associated with a bull ring coupling a gas burner or a coal fluidized bed to that sugar dryer.

* * * * *